(12) United States Patent
Deng et al.

(10) Patent No.: US 10,353,435 B2
(45) Date of Patent: Jul. 16, 2019

(54) ELECTRONIC DEVICE SYSTEM WITH A CONFIGURABLE DISPLAY

(71) Applicants: Intel Corporation, Santa Clara, CA (US); Shanjun Deng, Shanghai (CN); Hong W. Wong, Portland, OR (US); Xiaoguo Liang, Shanghai (CN); Jiancheng Johnson Tao, Shanghai (CN); Wah Yiu Kwong, Hillsboro, OR (US)

(72) Inventors: Shanjun Deng, Shanghai (CN); Hong W. Wong, Portland, OR (US); Xiaoguo Liang, Shanghai (CN); Jiancheng Johnson Tao, Shanghai (CN); Wah Yiu Kwong, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/026,046

(22) PCT Filed: Nov. 14, 2013

(86) PCT No.: PCT/CN2013/087134
§ 371 (c)(1),
(2) Date: Mar. 30, 2016

(87) PCT Pub. No.: WO2015/070419
PCT Pub. Date: May 21, 2015

(65) Prior Publication Data
US 2016/0246332 A1    Aug. 25, 2016

(51) Int. Cl.
*G06F 1/16* (2006.01)
*H01R 13/62* (2006.01)

(52) U.S. Cl.
CPC .......... *G06F 1/1654* (2013.01); *G06F 1/1616* (2013.01); *G06F 1/1632* (2013.01);
(Continued)

(58) Field of Classification Search
CPC .... G06F 1/1632; G06F 1/1626; G06F 1/1654; G06F 1/1669; G06F 1/1662;
(Continued)

(56) References Cited

U.S. PATENT DOCUMENTS

2004/0190234 A1* 9/2004 Lin .................. G06F 1/162
361/679.28
2004/0246666 A1* 12/2004 Maskatia ............ G06F 1/1616
361/679.57
(Continued)

FOREIGN PATENT DOCUMENTS

CN       202306389 U      7/2012
CN       103186185 A      7/2013
(Continued)

OTHER PUBLICATIONS

English translation of CN 202306389 provided in the IDS.*
(Continued)

*Primary Examiner* — Abhishek M Rathod
(74) *Attorney, Agent, or Firm* — Patent Capital Group

(57) ABSTRACT

Particular embodiments described herein provide for an electronic device, such as a notebook computer or laptop, that includes a circuit board coupled to a plurality of electronic components (which includes any type of components, elements, circuitry, etc.). One particular example implementation of the electronic device may include a keyboard portion that includes a plurality of keys; a display portion that includes a first display interconnect for operating the electronic device in a first configuration, and a second display interconnect for operating the electronic device in a second configuration; and a docking portion that includes a keyboard interconnect configured to be mated with at least one of the first display interconnect and the second display interconnect.

19 Claims, 11 Drawing Sheets

(52) U.S. Cl.
CPC ........ *G06F 1/1662* (2013.01); *H01R 13/6205* (2013.01); *H01R 2201/06* (2013.01)

(58) Field of Classification Search
CPC .............. G06F 1/1616; H01R 2201/06; H01R 13/6205; Y10T 29/49002
See application file for complete search history.

(56) References Cited

U.S. PATENT DOCUMENTS

| | | | | |
|---|---|---|---|---|
| 2008/0024966 | A1* | 1/2008 | Huang | G06F 1/1626 |
| | | | | 361/679.06 |
| 2008/0232061 | A1* | 9/2008 | Wang | G06F 1/1632 |
| | | | | 361/679.41 |
| 2009/0141439 | A1* | 6/2009 | Moser | G06F 1/1616 |
| | | | | 361/679.29 |
| 2011/0199726 | A1* | 8/2011 | Moser | G06F 1/1654 |
| | | | | 361/679.09 |
| 2013/0044425 | A1* | 2/2013 | Lin | G06F 1/1632 |
| | | | | 361/679.43 |
| 2013/0155583 | A1* | 6/2013 | Yang | G06F 1/1626 |
| | | | | 361/679.01 |
| 2013/0163187 | A1* | 6/2013 | Wang | G06F 1/1632 |
| | | | | 361/679.41 |
| 2013/0170126 | A1* | 7/2013 | Lee | G06F 1/1654 |
| | | | | 361/679.17 |
| 2013/0178111 | A1* | 7/2013 | Chang | G06F 1/1654 |
| | | | | 439/660 |
| 2015/0039800 | A1* | 2/2015 | Lee | G06F 1/1632 |
| | | | | 710/303 |
| 2015/0198980 | A1* | 7/2015 | Aoki | G06F 1/1616 |
| | | | | 361/679.17 |
| 2015/0205330 | A1* | 7/2015 | Zhang | G06F 1/1626 |
| | | | | 361/679.3 |

FOREIGN PATENT DOCUMENTS

| | | |
|---|---|---|
| GB | 2 432 688 A | 5/2007 |
| WO | WO 2015/070419 A1 | 5/2015 |

OTHER PUBLICATIONS

International Search Report and Written Opinion in International Application No. PCT/CN2013/087134, dated Aug. 29, 2014, 13 pages.

* cited by examiner

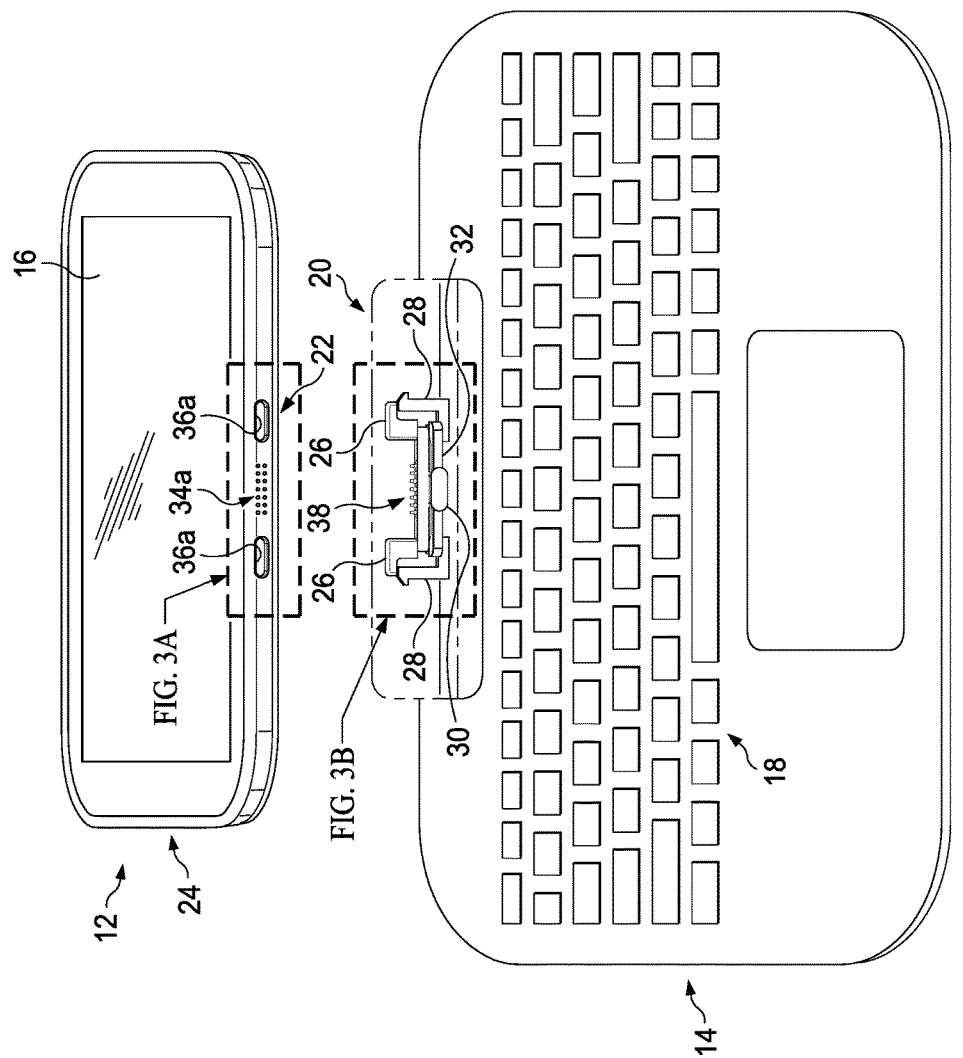

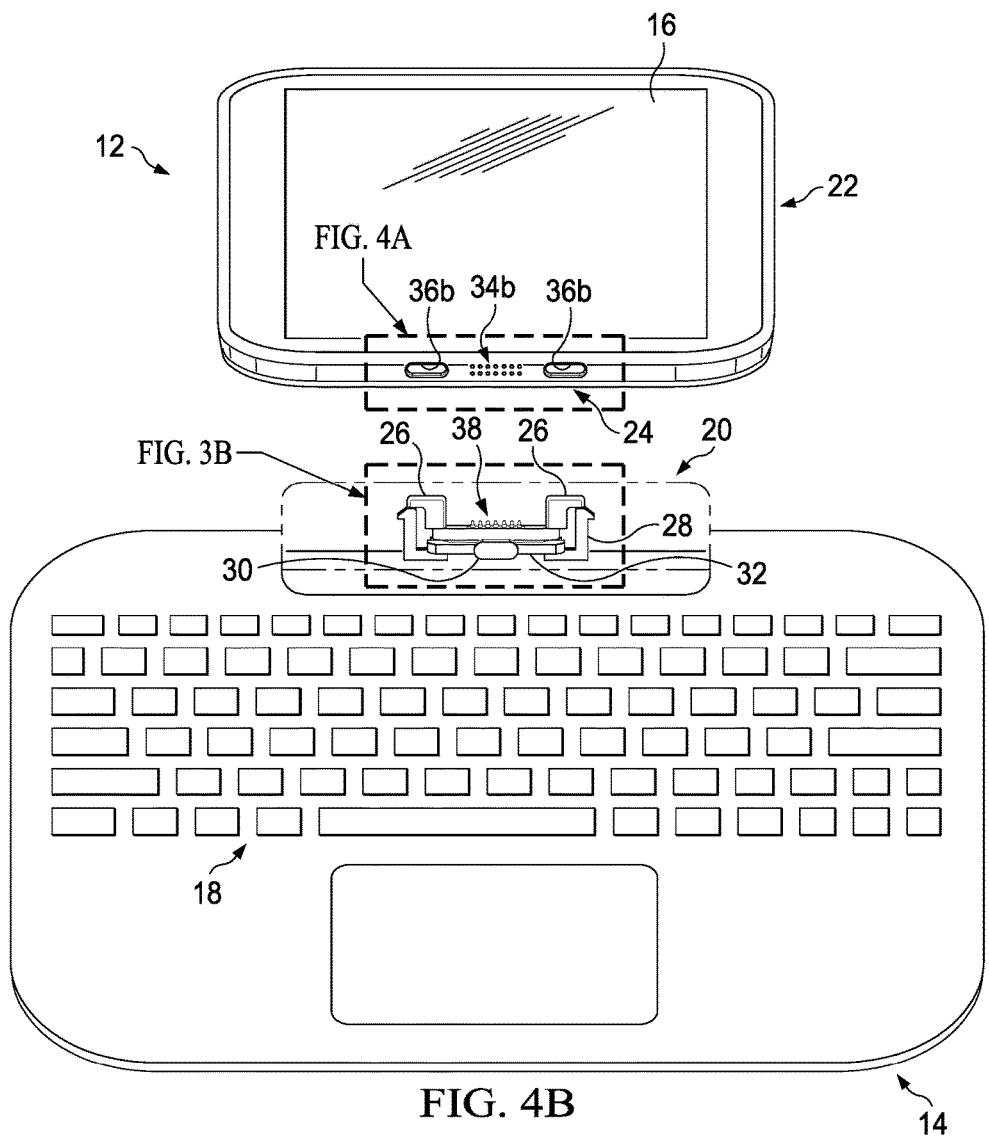

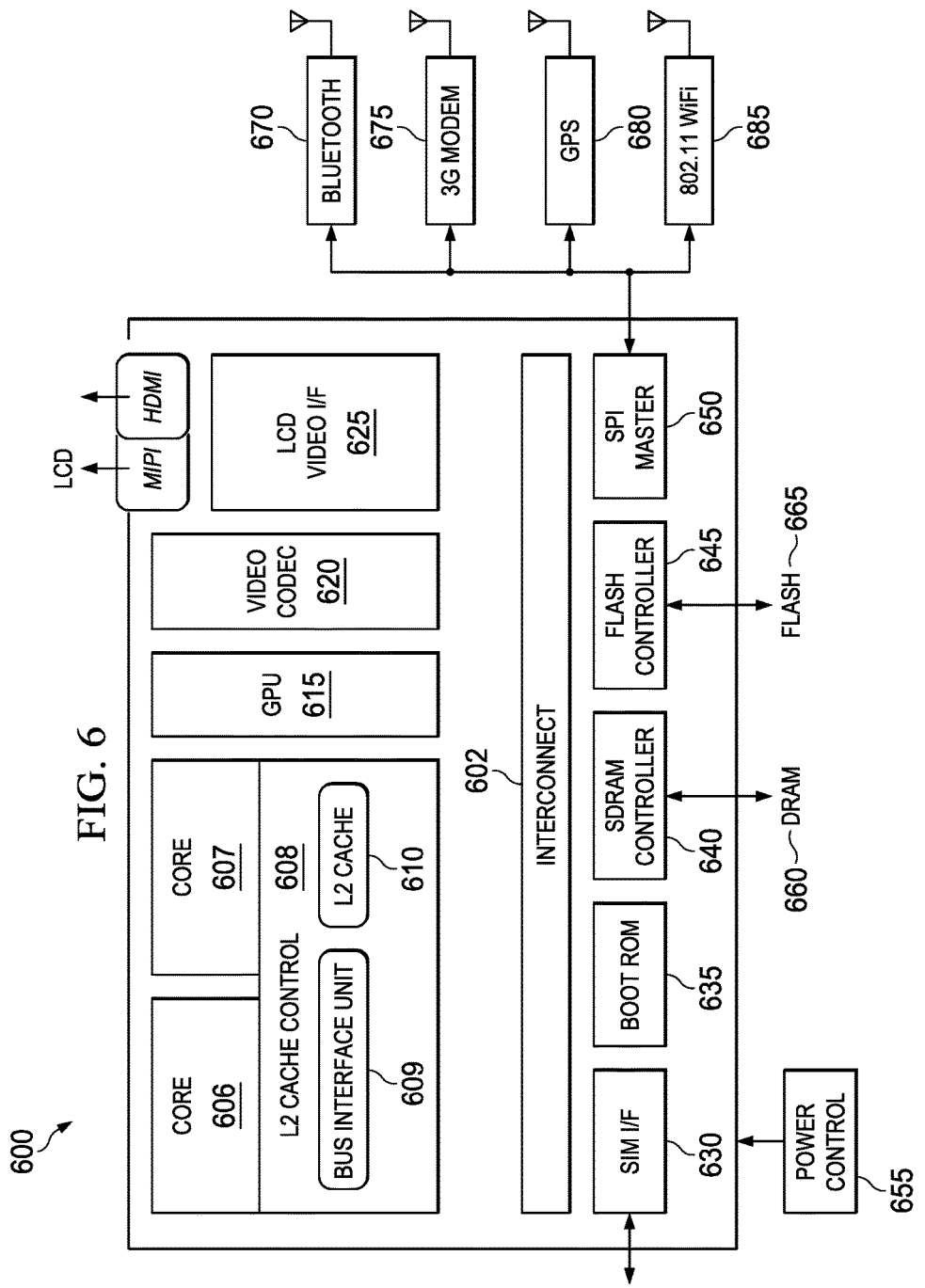

ELECTRONIC DEVICE SYSTEM WITH A CONFIGURABLE DISPLAY

CROSS-REFERENCE TO RELATED APPLICATION

This Application is a National Stage application under 35 U.S.C. 371 of International Application PCT/CN2013/087134, filed on Nov. 14, 2013 and entitled ELECTRONIC DEVICE SYSTEM WITH A CONFIGURABLE DISPLAY. The disclosure of the prior application is considered part of and is incorporated by reference in the disclosure of this application.

TECHNICAL FIELD

Embodiments described herein generally relate to the field of electronic devices and, more particularly, to a configurable display for an electronic device.

BACKGROUND

End users have more electronic device choices than ever before. A number of prominent technological trends are currently afoot (e.g., more computing devices, more detachable displays, etc.), and these trends are changing the electronic device landscape. One of the technological trends is a convertible or hybrid laptop. The convertible laptop is any type of computer system that has a detachable display and can essentially function as either a laptop or a tablet computer. In many instances, docking hinge solutions for a convertible laptop only support a landscape (horizontal) mode, but cannot support a portrait (vertical) mode. Hence, there is a challenge in providing an electronic device that allows the display to be in either a landscape configuration or a portrait configuration.

BRIEF DESCRIPTION OF THE DRAWINGS

Embodiments are illustrated by way of example and not by way of limitation in the FIGURES of the accompanying drawings, in which like references indicate similar elements and in which:

FIG. 3C is a simplified schematic diagram illustrating an embodiment of an electronic device, in accordance with one embodiment of the present disclosure;

FIG. 4B is a simplified schematic diagram illustrating an embodiment of an electronic device, in accordance with one embodiment of the present disclosure;

FIG. 6 is a simplified block diagram associated with an example ARM ecosystem system on chip (SOC) of the present disclosure.

Figure 1A:
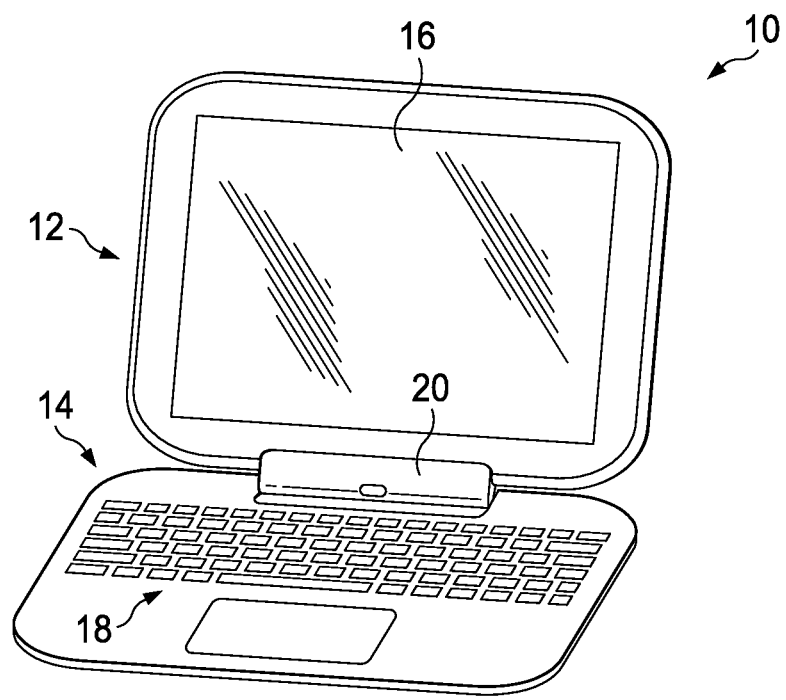
FIG. 1A is a simplified schematic diagram illustrating an embodiment of an electronic device in an open landscape clamshell configuration, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

An electronic device is provided in one example embodiment and includes a plurality of electronic components (which can include any type of components, elements, circuitry, etc.). One particular example implementation of the electronic device may include a keyboard portion that includes a plurality of keys; a display portion that includes a first display interconnect for operating the electronic device in a first configuration, and a second display interconnect for operating the electronic device in a second configuration; and a docking portion that includes a keyboard interconnect configured to be mated with at least one of the first display interconnect and the second display interconnect. The first configuration can be associated with a horizontal orientation (e.g., landscape or profile) for the display, while the second configuration can be a vertical orientation (e.g., portrait) for the display. Note that the first and second configurations can easily be swapped or exchanged for each other, where the first configuration can be representative of the vertical orientation, while the second configuration can be representative of the horizontal orientation.

In other embodiments, the display portion includes a display and the display operates in a landscape configuration when the electronic device is in the first configuration. Additionally, the display portion can include a display and the display operates in a portrait configuration when the electronic device is in the second configuration. In still other embodiments, the first display interconnect is located on a first side of the display portion and the second display interconnect is located on a second side of the display portion, and the first side is adjacent to the second side. In certain examples, the display portion can be connected to the keyboard portion in a landscape clamshell mode configuration, a landscape movie mode configuration, a tablet mode configuration, a portrait clamshell mode configuration, and a portrait movie mode configuration. The keyboard interconnect can be a pogo pin connector that can mate with the first display interconnect and the second display interconnect. In specific implementations, the display portion can include at least one tab that operates as a securing mechanism to secure the display portion to the keyboard portion. In addition, the docking portion can include at least one post to guide the display portion during rotation thereof. In a specific example, the display portion can be configured to operate as a standalone tablet, and the display portion may include a wireless module.

Example Embodiments

The following detailed description sets forth example embodiments of apparatuses, methods, and systems relating to detachable display configurations for an electronic device. Features such as structure(s), function(s), and/or characteristic(s), for example, are described with reference to one embodiment as a matter of convenience; various embodiments may be implemented with any suitable one or more of the described features.

Turning to FIG. 1A, FIG. 1A is a simplified orthographic view illustrating an embodiment of an electronic device 10 in an open landscape clamshell mode configuration in accordance with one embodiment of the present disclosure. Electronic device 10 may include a display portion 12, a keyboard portion 14, and a hinge 20 (which can, more generally, form part of a docking portion). Display portion 12 can include a display 16. Keyboard portion 14 can include a keyboard 18. Hinge 20 can define an axis of rotation that is shared between display portion 12 and keyboard portion 14. In the illustrated open landscape clamshell mode configuration, display 16 is in a landscape orientation where the width of display 16 is longer than the height of display 16.

In one or more embodiments, electronic device 10 is a notebook computer or laptop computer. In still other embodiments, electronic device 10 may be any suitable electronic device having a display such as a mobile device, a tablet computer and/or a tablet device (e.g., i-Pad™) Phablet™, a personal digital assistant (PDA), a smartphone, an audio system, a movie player of any type, a computer docking station, etc. In yet another embodiment, most of the electronics (e.g., processor, memory, etc.) for electronic device 10 reside in keyboard portion 14.

In one or more embodiments, display 16 can be a liquid crystal display (LCD) display screen, a light-emitting diode (LED) display screen, an organic light-emitting diode (OLED) display screen, a plasma display screen, or any other suitable display screen system. Display 16 may be a touchscreen that can detect the presence and location of a touch within the display area. In another embodiment, display portion 12 may contain a battery and various electronics (e.g., processor, memory, etc.) to allow display portion 12 to operate as a standalone tablet. In another embodiment, display portion 12 may contain a wireless module (e.g., Wi-Fi module, Bluetooth module, etc.) that allows keyboard portion 14 to communicate with display portion 12 when display portion 12 is removed from keyboard portion 14. In yet another embodiment, display portion 12 may contain a camera, a microphone, and speakers.

Figure 1B:
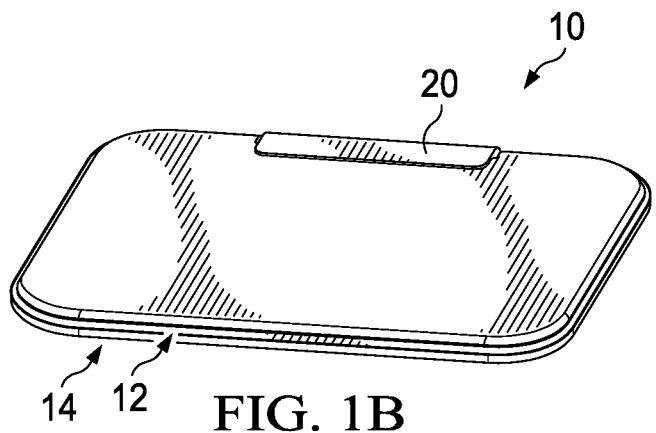
FIG. 1B is a simplified schematic diagram illustrating an embodiment of an electronic device in a closed clamshell configuration, in accordance with one embodiment of the present disclosure.
Figure 1C:
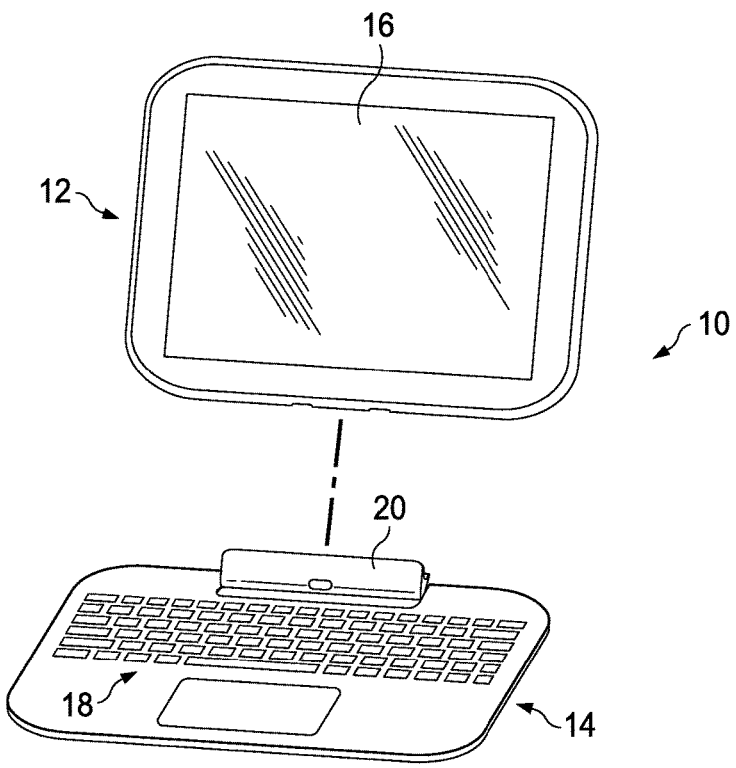
FIG. 1C is a simplified schematic diagram illustrating an embodiment of an electronic device in a detached configuration, separated into two segments, in accordance with one embodiment of the present disclosure.

Turning to FIG. 1B, FIG. 1B is a simplified orthographic view of electronic device 10 in a closed clamshell configuration in accordance with one embodiment of the present disclosure. FIG. 1C is a simplified schematic diagram illustrating an embodiment of electronic device 10 in a detach mode, separated into two segments. As illustrated, display portion 12 has been separated from keyboard portion 14.

Figure 1D:
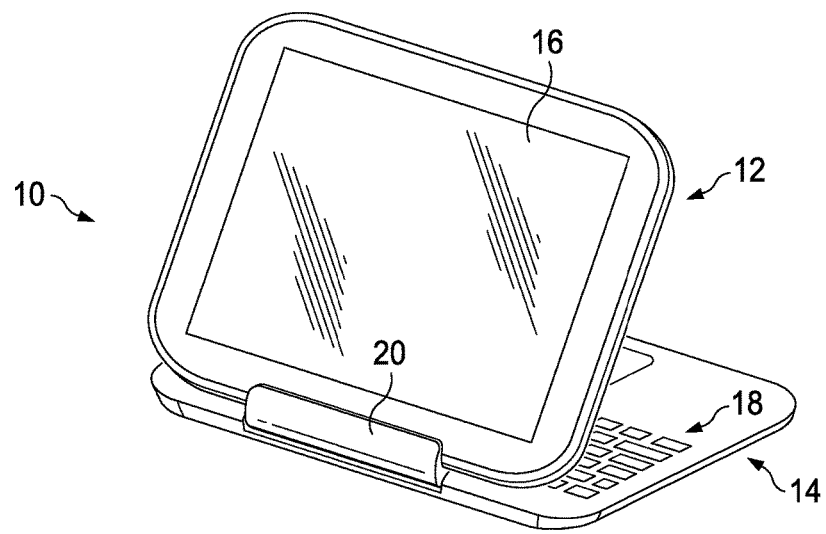
FIG. 1D is a simplified schematic diagram illustrating an embodiment of an electronic device in a landscape movie mode configuration, in accordance with one embodiment of the present disclosure.
Figure 1E:
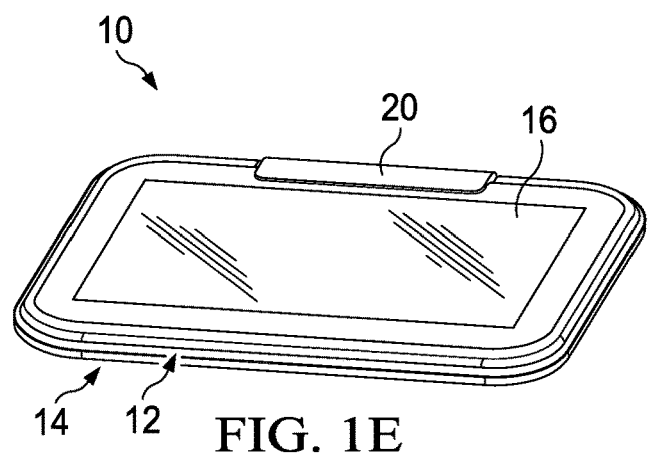
FIG. 1E is a simplified schematic diagram illustrating an embodiment of an electronic device in a tablet configuration, in accordance with one embodiment of the present disclosure.

FIG. 1D is a simplified schematic diagram illustrating an embodiment of an electronic device in a landscape movie mode configuration in accordance with one embodiment of the present disclosure. In one embodiment, display portion 12 has been turned over so display 16 faces away from keyboard 18 and the width of display 16 is greater than the height of display 14. FIG. 1E is a simplified schematic diagram illustrating an embodiment of an electronic device in a tablet mode configuration in accordance with one embodiment of the present disclosure. In one embodiment, display portion 12 has been turned over so display 16 faces away from keyboard 18 and electronic device 10 is a tablet computer or a tablet device.

Figure 1F:
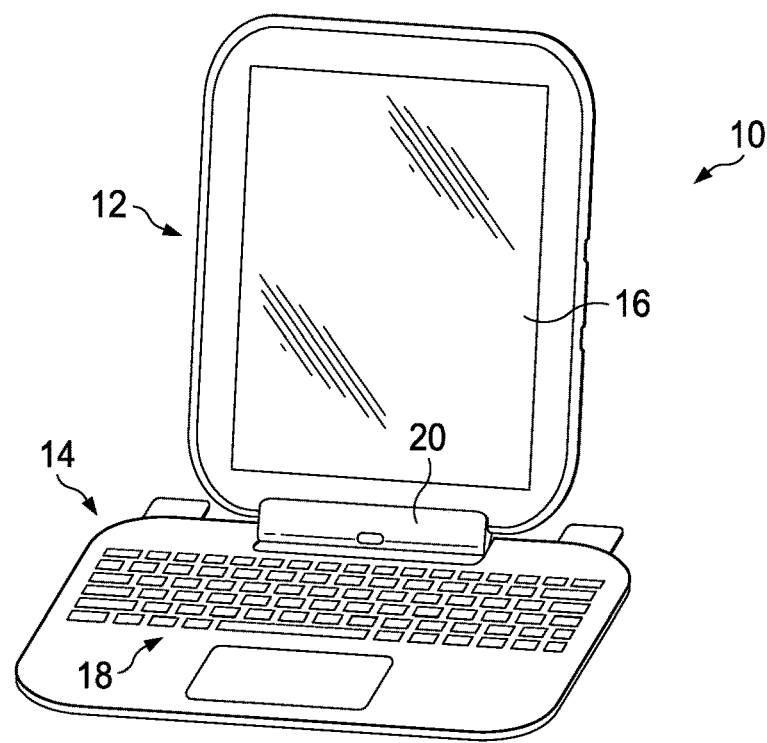
FIG. 1F is a simplified schematic diagram illustrating an embodiment of an electronic device in an open portrait clamshell configuration, in accordance with one embodiment of the present disclosure.
Figure 1G:
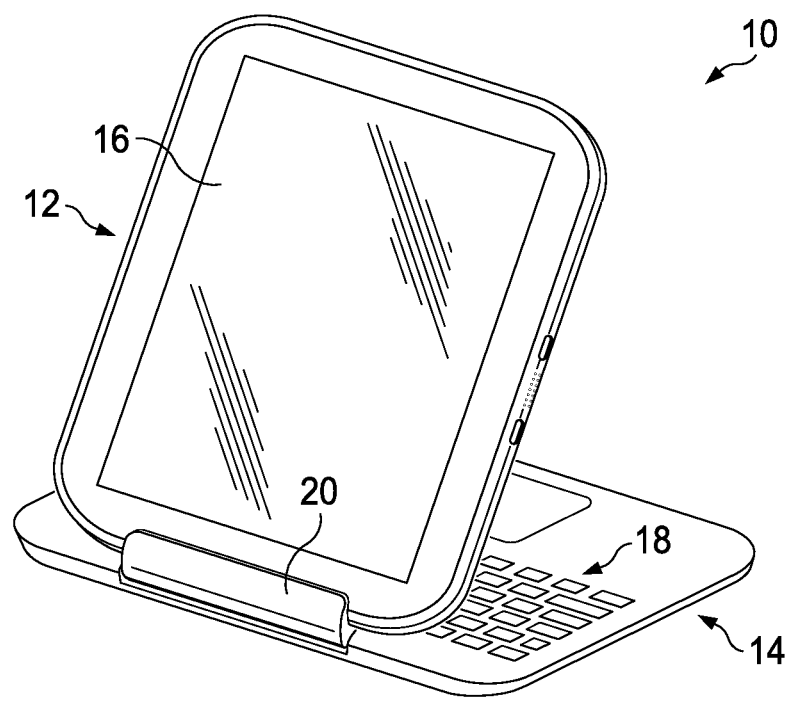
FIG. 1G is a simplified schematic diagram illustrating an embodiment of an electronic device in a portrait movie mode configuration, in accordance with one embodiment of the present disclosure.

FIG. 1F is a simplified schematic diagram illustrating an embodiment of an electronic device in an open portrait clamshell mode configuration in accordance with one embodiment of the present disclosure. In the illustrated open portrait clamshell mode configuration, display 16 is in a portrait orientation where the height of display 16 is greater than the width of display 16. FIG. 1G is a simplified schematic diagram illustrating an embodiment of an electronic device in a portrait movie mode configuration in accordance with one embodiment of the present disclosure. In the illustrated portrait movie mode configuration, display 16 faces away from keyboard 18 and is in a portrait orientation where the height of display 16 is greater than the width of display 16. FIGS. 1A-1G illustrate the configurability of electronic device 10. For example, display portion 12 may be connected to keyboard portion 14 in a landscape clamshell mode configuration, a landscape movie mode configuration, a tablet mode configuration, a portrait clamshell mode configuration, or a portrait movie mode configuration.

Because the pin-outs in the movie mode configurations and tablet configuration (i.e., landscape movie mode configuration illustrated in FIG. 1D, portrait movie mode configuration illustrated in FIG. 1G, and tablet mode configuration illustrated in FIG. 1E) are all reversed from the clamshell configurations (i.e., open landscape clamshell mode configuration illustrated in FIG. 1A, closed clamshell configuration illustrated in FIG. 1B, and open portrait clamshell mode configuration illustrated in FIG. 1F), electronic device 10 can be configured to detect such changes with sensors (e.g., a hall sensor). Control logic in electronic device 10 can electrically multiplex the correct signals to support the different configurations. More specifically, in an embodiment, the pin-outs for both display portion 12 and keyboard portion 14 in the clamshell configurations can be +5V on pin 1, spare on pin 2, +data on pin 3, −data on pin 4, and ground on pin 5 for. When electronic device 10 is in a movie mode configuration or a tablet configuration, the pin-outs for either display portion 12 or keyboard portion 14 will be reversed. For example, the pin-outs on display portion 12 may stay the same (i.e., +5V on pin 1, spare on pin 2, +data on pin 3, −data on pin 4, and ground on pin 5) but the pin-outs on keyboard portion 14 will be reversed (i.e., ground on pin 1, +data on pin 2, −data on pin 3, spare on pin 4, and +5V on pin 5). Because the pin definition of keyboard portion 14 changes the connector definition, the multiplexing may be done on keyboard portion 14. If the pin-outs on display portion 12 were reversed and the pin definition of display portion 12 changes the connector definition, then the multiplexing may be done on display portion 12.

In some embodiments, with a symmetric pin out definition, (e.g., +5V on pin 1, −5 on pin 2, +data on pin 3, −data on pin 4, −5 on pin 5, and +5 on pin 6) only the data signals need to be multiplexed as they are the only signals that will be reversed. In addition, some bus definitions allow "polarity inversion", especially for the differential signals (e.g., a Peripheral Component Interconnect Express (PCIe®) bus). With this type of signals, there is no need to do multiplexing. Further, some signals need to be point-to-point routing (not allowing a T topology). As a result, a sensor can be on display portion 12 to determine how the signals need to be multiplexed. In other embodiments, electronic device 10 may use other means to detect the different configurations illustrated in FIGS. 1A-G (e.g., a mechanical pin may be used to detect the different configurations). For example, when a specific connector is mated to keyboard portion 14 when display portion 12 is docked, a "low" signal by grounding a pin may be used to direct the switching of the multiplexer.

In general terms, electronic device 10 may be configured to provide a display portion coupled to a keyboard portion at a hinge. The hinge can be configured such that the keyboard portion and the display portion can be separated. The display portion can include two sets of female pogo pin connectors (or other type of docking connector) and two support posts holes with one set located at the bottom of the display portion and the other set located on one side (e.g., left side) of the display portion. This allows the display portion to be attached to the keyboard portion in either a horizontal configuration or a portrait configuration. The overall system can be configured to operate in a landscape clamshell mode configuration, a landscape movie mode configuration, a tablet mode configuration, a portrait clamshell mode configuration, or a portrait movie mode configuration.

For purposes of illustrating certain example features of electronic device 10, the following foundational information may be viewed as a basis from which the present disclosure may be properly explained. With the recent touch optimized operating system (OS) release for tablets, convertible laptops (i.e., clamshell computers) have become more popular. However, convertible hinge designs have drawbacks with usability issues for certain consumer groups. For example, current docking hinge solutions only support a landscape (horizontal) mode, but cannot support a portrait (vertical) mode. In at least one example embodiment discussed herein, an electrical device can be configured to allow the display portion of the electronic device to be removable such that the overall system can be configured to operate in a landscape clamshell mode configuration, a landscape movie mode configuration, a tablet mode configuration, a portrait clamshell mode configuration, or a portrait movie mode configuration.

Particular embodiments described herein provide for an electronic device, such as a notebook computer, laptop, cellphone, or other mobile device that includes a circuit board coupled to a plurality of electronic components (which includes any type of components, elements, circuitry, etc.). The electronic device may also include a display portion coupled to a keyboard portion at a hinge. The hinge can be configured to allow the keyboard portion and the display portion to be separated and the overall system can be configured to operate in in a landscape clamshell mode configuration, a landscape movie mode configuration, a tablet mode configuration, a portrait clamshell mode configuration, or a portrait movie mode configuration. Certain embodiments presented herein can allow for an effective hinge and connection capability that provides an orientation flexibility and suitable connection to enable configurability between the keyboard portion and the display portion.

The hinge can include connectors and mechanical retentions to provide an electrical connection between the display portion and the keyboard portion. In an embodiment, a printed circuit board (PCB) interconnector is used to electrically connect the display portion and the keyboard portion. In another embodiment, the hinge can include a pogo pin male connector (or other type of docking connector) in the hinge with two closed support posts. The display portion can include two sets of female pogo pin connectors (or other type of docking connector) and two support posts holes with one set located at the bottom of the display portion and the other set located on one side (e.g., left side) of the display portion. This allows the display portion to be attached to the keyboard portion in either a horizontal configuration or a portrait configuration and the pogo pins can form a mechanical and electrical connection between the display portion and the keyboard portion. The support posts can guide the display portion during connection and provide support for the display portion when it is connected to the keyboard portion. A locking mechanism can mitigate against detachment during general usage.

Additionally, the display portion may be separated from the keyboard portion both electrically and mechanically, allowing the display portion to alternate between a landscape configuration and a portrait configuration. In an embodiment, the majority of the system components (e.g., motherboard, hard drive, battery, communication modules, etc.) remain in the keyboard portion. In certain embodiments, the display can be a touchscreen display. The display portion may also contain a camera module, microphone, speakers, and/or a wireless module. Such a design allows for the electronic device to function in a clamshell configuration or a tablet configuration. In an embodiment, the display includes a plurality of electrical components that allow the display portion to function or operate as a standalone tablet.

Figure 2:
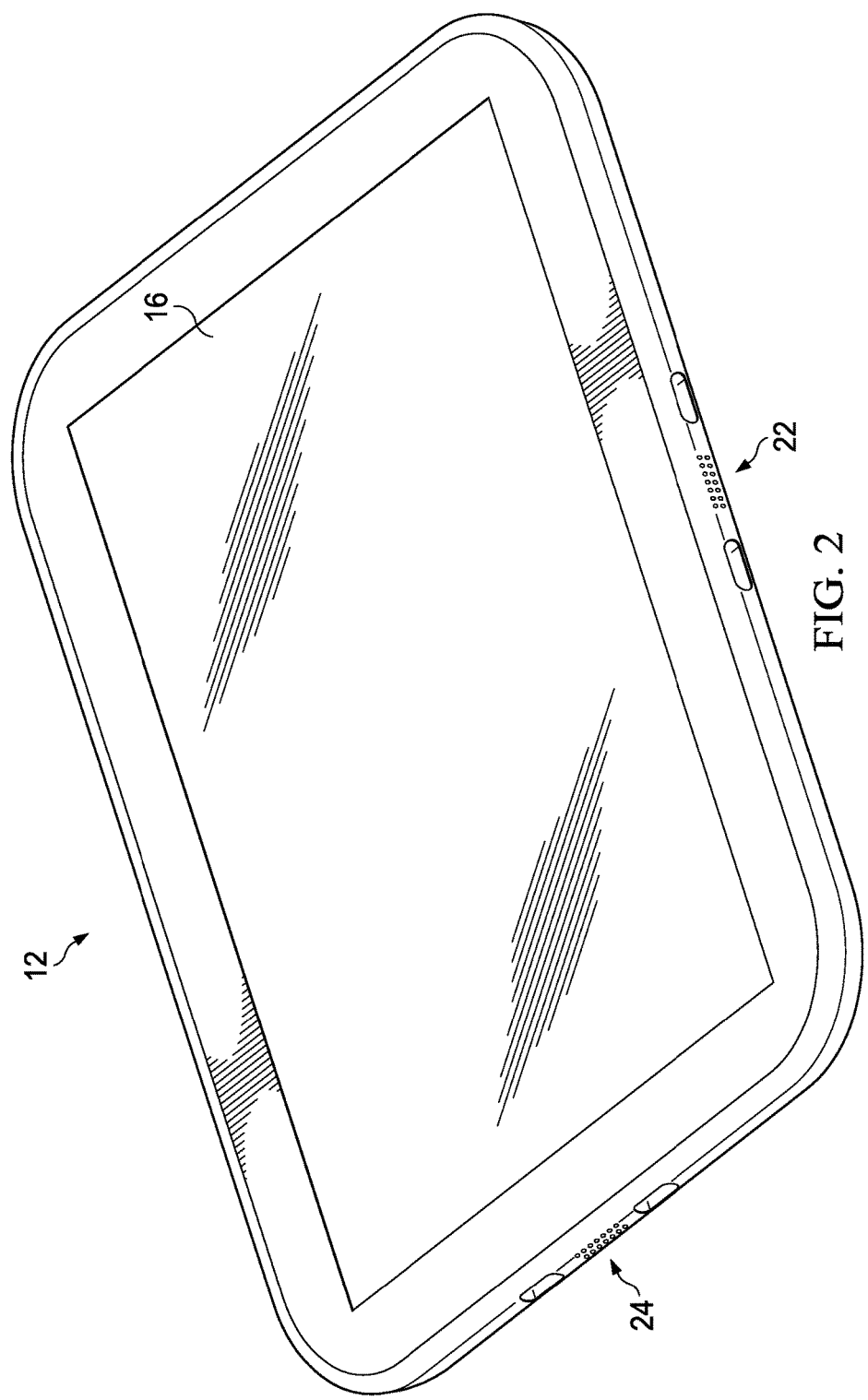
FIG. 2 is a simplified schematic diagram illustrating an embodiment of an electronic device in accordance with one embodiment of the present disclosure.

Turning to FIG. 2, FIG. 2 is a simplified schematic diagram illustrating an embodiment of an electronic device, in accordance with one embodiment of the present disclosure. As illustrated in FIG. 2, display portion 12 can include display 16, a first display connection area 22, and a second display connection area 24. First display connection area 22 may be located on one side of display portion 12 and second display connection area 24 may be located on an adjacent side of display portion 12. First display connection area 22 may be used to connect display portion 12 to keyboard portion 14 in a landscape clamshell mode configuration, a landscape movie mode configuration, or a tablet mode configuration. Second display connection area 24 may be used to connect display portion 12 to keyboard portion 14 in a portrait clamshell mode configuration or a portrait movie mode configuration.

Figure 3A:
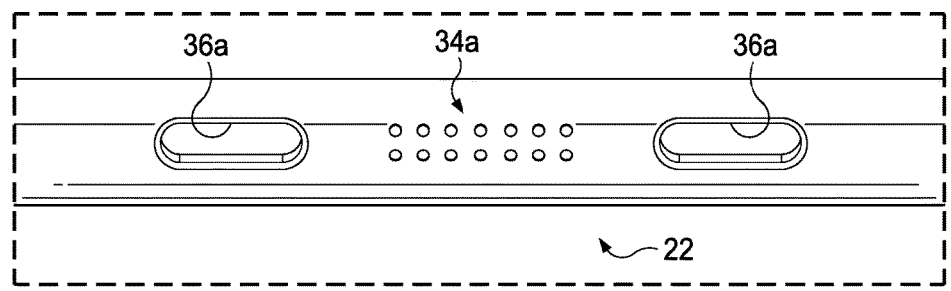
FIG. 3A is a simplified schematic diagram illustrating an embodiment of a portion of an electronic device in accordance with one embodiment of the present disclosure.

Turning to FIG. 3A, FIG. 3A is a simplified schematic diagram illustrating an embodiment of a portion of an electronic device, in accordance with one embodiment of the present disclosure. As illustrated in FIG. 3A, first display connection area 22 can include a first display interconnect 34a and first display support areas 36a. In an embodiment, first display interconnect 34a may be female pogo pin connectors or other type of docking connector (e.g., a PCB interconnector).

Figure 3B:
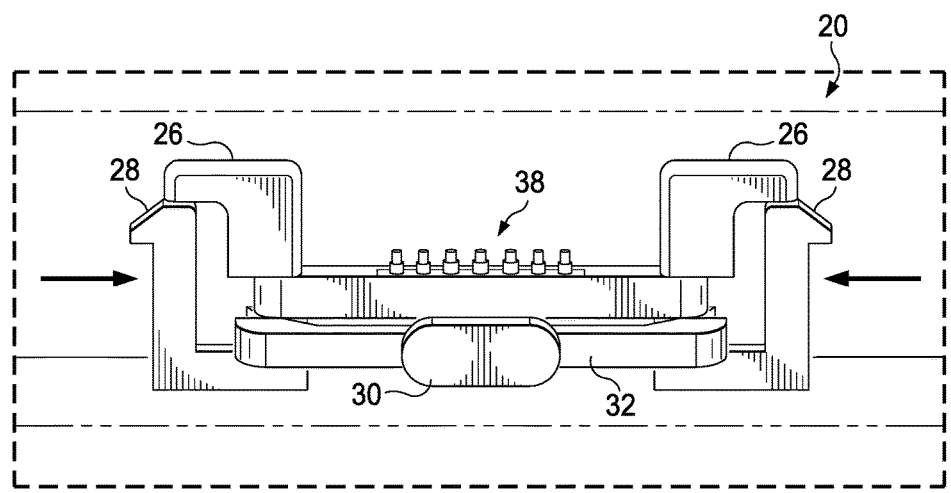
FIG. 3B is a simplified schematic diagram illustrating an embodiment of a portion of an electronic device, in accordance with one embodiment of the present disclosure.

Turning to FIG. 3B, FIG. 3B is a simplified schematic diagram illustrating an embodiment of a portion of an electronic device, in accordance with one embodiment of the present disclosure. As illustrated in FIG. 3B, hinge 20 can include a keyboard interconnect 38, display supports 26, securing tabs 28 (e.g., a securing mechanism that can include hooks, magnetic elements, etc.), a release 30, and a release mechanism 32. Keyboard interconnect 38 may be male pogo pin connectors or other type of docking connector (e.g., a PCB interconnector).

Turning to FIG. 3C, FIG. 3C is a simplified schematic diagram illustrating an embodiment of an electronic device, in accordance with one embodiment of the present disclosure. In this particular embodiment, display portion 12 is in a landscape configuration. As display portion 12 is lowered onto keyboard portion, display supports 26 can slide into first display support areas 36a. In addition, first display interconnect 34a can engage with keyboard interconnect 38 such that an electrical connection is created between display portion 12 and keyboard portion 14. In an embodiment, a mechanical snap-in feature may be used to attach, retain, and detach display portion 12 and keyboard portion 14.

For example, as display supports 26 slide into first display support areas 36a, securing tabs 28 may engage display portion 12 to form a compression connection. In one example operation, when keyboard portion 14 is lowered onto display portion 12, display supports 26 help align display portion 12 with keyboard portion 14 and secure first display interconnect 34a to keyboard interconnect 38.

Release 30 can be activated (e.g., by pushing or sliding release 30) such that release mechanism 32 pulls securing tabs 28 inward and thus releases the compression connection. Note that display supports 26, securing tabs 28, release 30, and release mechanism 32 are used as examples only and the examples provided should not limit the scope or inhibit the broad teachings of the configurable electronic device, as potentially applied to a myriad of other architectures. In an embodiment, keyboard interconnect 38, display supports 26, and securing tabs 28 are on hinge 20.

Using first display interconnect 34a and keyboard interconnect 38, an electrical current and signals can be passed from/to display portion 12 to/from keyboard portion 14 to recharge an on-board battery or capacitor, power any number of items (e.g., display 16, a wireless module, camera, speakers, etc.), and provide a communication path between display portion 12 and keyboard portion 14. In other examples, electrical current and signals can be passed through a plug-in connector (e.g., whose male side protrusion connects to display portion 12 and whose female side connects to keyboard portion 14 or vice-verse). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10. [Thunderbolt™ and the Thunderbolt logo are trademarks of Intel Corporation in the U.S. and/or other countries.]. Virtually any other electrical connection methods could be used and, thus, are clearly within the scope of the present disclosure.

Figure 4A:
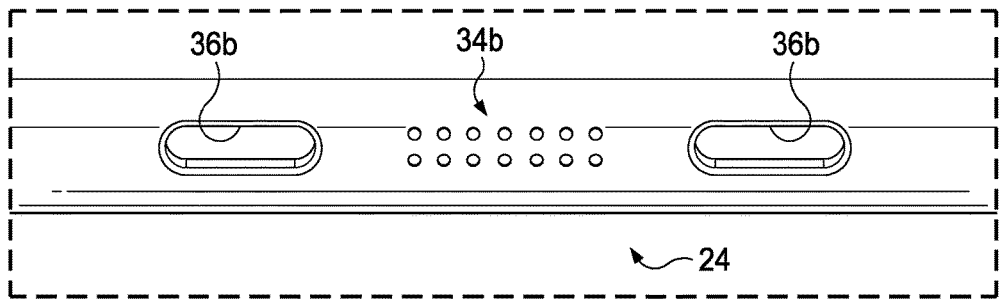
FIG. 4A is a simplified schematic diagram illustrating an embodiment of a portion of an electronic device in accordance with one embodiment of the present disclosure.

Turning to FIG. 4A, FIG. 4A is a simplified schematic diagram illustrating an embodiment of a portion of an electronic device, in accordance with one embodiment of the present disclosure. As illustrated in FIG. 4A, second display connection area 24 can include a second display interconnect 34b and second display support areas 36b. In an embodiment, second display interconnect 34b may be female pogo pin connectors or other type of docking connector (e.g., a PCB interconnector).

Turning to FIG. 4B, FIG. 4B is a simplified schematic diagram illustrating an embodiment of an electronic device, in accordance with one embodiment of the present disclosure. In this particular embodiment, display portion 12 is in a portrait configuration. As display portion 12 is lowered onto keyboard portion, display supports 26 can slide into second display support areas 36b. Also, second display interconnect 34b can engage with keyboard interconnect 38 such that an electrical connection is created between display portion 12 and keyboard portion 14.

As display supports 26 slide into second display support areas 36b, securing tabs 28 may engage display portion 12 to form a compression connection. In one example operation, when keyboard portion 14 is lowered onto display portion 12, display supports 26 may help align display portion 12 with keyboard portion 14 and secure second display interconnect 34b to keyboard interconnect 38. Release 30 can be activated (e.g., by pushing or sliding release 30) such that release mechanism 32 pulls securing tabs 28 inward and thus releases the compression connection. [It imperative to note that any of the embodiments discussed herein (e.g., a dual interconnect) can readily be a 3-way or a 4-way interconnect so that a given tablet portion could readily connect regardless of which side would be closest to the keyboard portion. Any such design alternatives are clearly within the broad scope of the present disclosure.]

Using second display interconnect 34b and keyboard interconnect 38, an electrical current and signals can be passed from/to display portion 12 to/from keyboard portion 14 to recharge an on-board battery or capacitor, power any number of items (e.g., display 16, a wireless module, camera, speakers, etc.), and provide a communication path between display portion 12 and keyboard portion 14. In other examples, electrical current and signals can be passed through a plug-in connector (e.g., whose male side protrusion connects to display portion 12 and whose female side connects to keyboard portion 14 or vice-verse). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10. [Thunderbolt™ and the Thunderbolt logo are trademarks of Intel Corporation in the U.S. and/or other countries.]. Virtually any other electrical connection methods could be used and, thus, are clearly within the scope of the present disclosure. Note that numerous different display portion 12 configurations may be electrically connected with keyboard portion 14, thus allowing multiple configurations for electronic device 10. For example, electronic device 10 can have a portrait tablet configuration and a portrait closed clamshell configuration where edges of keyboard portion 14 extend or stick out from behind display portion 12.

Figure 5:
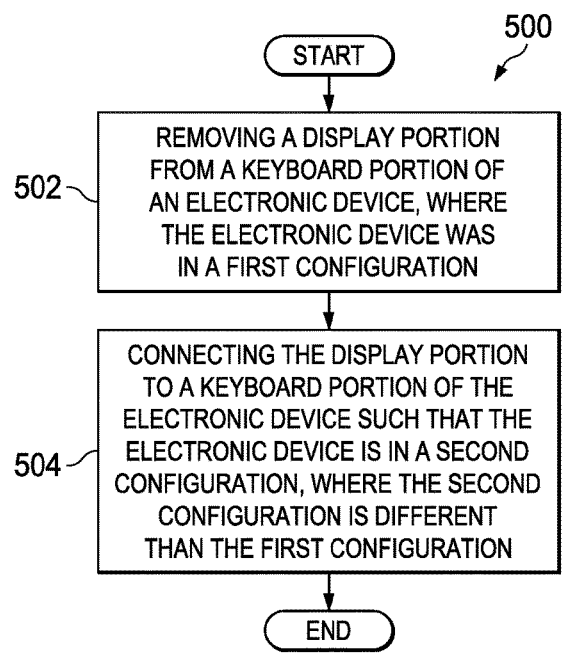
FIG. 5 is a simplified flow diagram illustrating potential operations associated with one embodiment of the present disclosure.

Turning to FIG. 5, FIG. 5 is a simplified flowchart 500 illustrating example activities of a configurable electronic device system. 502 can include removing a display portion from a keyboard portion of an electronic device, where the electronic device was in a first configuration. For example, the electronic device may have been in an open landscape clamshell configuration. 504 can include connecting the display portion to the keyboard portion of the electronic device such that the electronic device is in a second configuration, where the second configuration is different than the first configuration. For example, the second configuration may be an open portrait clamshell configuration.

FIG. 6 is a simplified block diagram associated with an example ARM ecosystem SOC 600 of the present disclosure. At least one example implementation of the present disclosure can include the configurable display features discussed herein and an ARM component. For example, the example of FIG. 6 can be associated with any ARM core (e.g., A-9, A-15, etc.). Further, the architecture can be part of any type of tablet, smartphone (inclusive of Android™ phones, i-Phones™, i-Pad™, Google Nexus™, Microsoft Surface™, personal computer, server, video processing components, laptop computer (inclusive of any type of notebook), Ultrabook™ system, any type of touch-enabled input device, etc.

In this example of FIG. 6, ARM ecosystem SOC 600 may include multiple cores 606-607, an L2 control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LDC.

ARM ecosystem SOC 600 may also include a subscriber identity module (SIM) OF 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more example embodiment include one or more communication capabilities, interfaces, and features such as instances of Bluetooth™ 670, a 3G modem 675, a global positioning system (GPS) 680, and an 802.11 WiFi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 7:
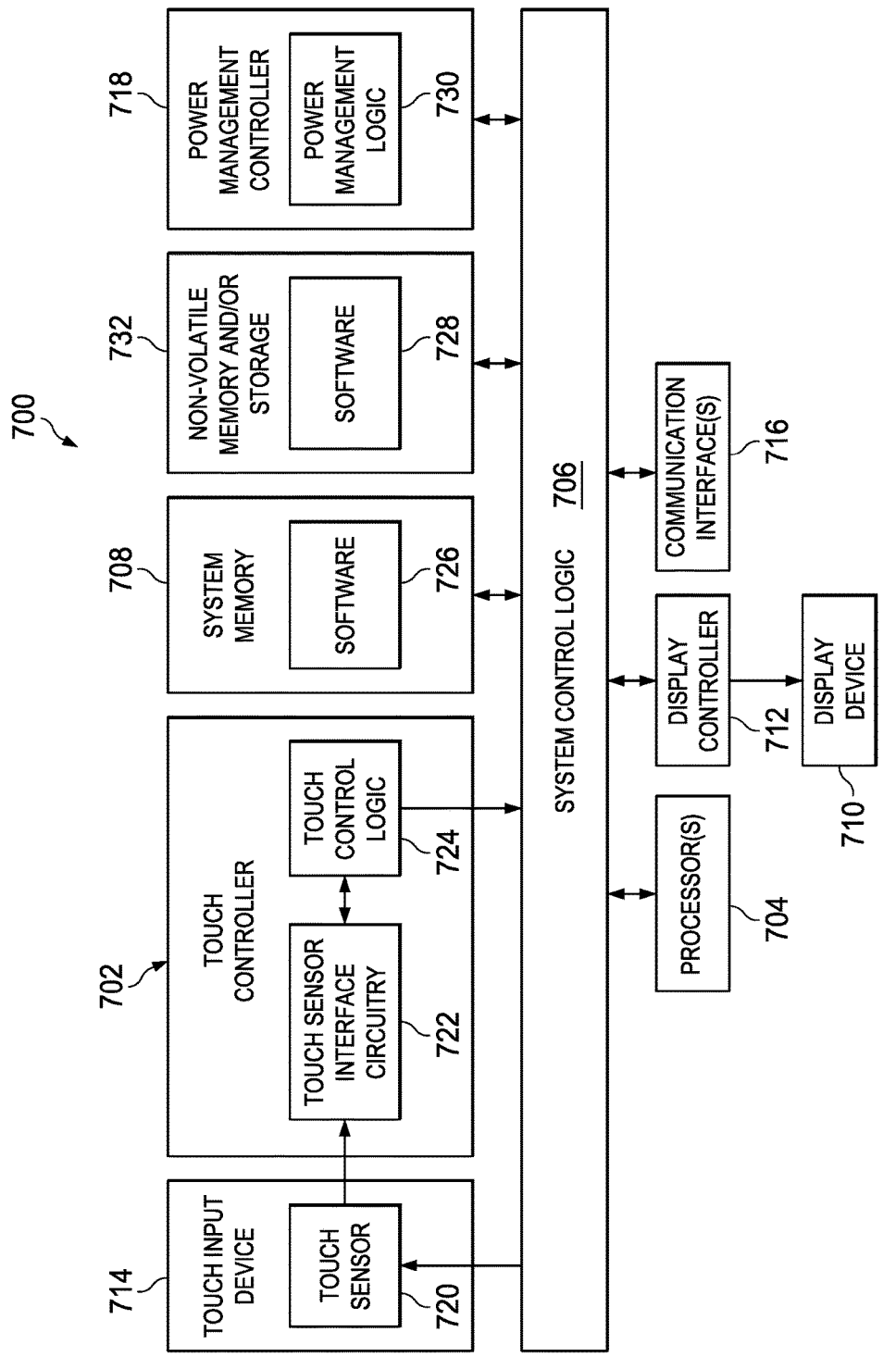
FIG. 7 is a simplified block diagram illustrating example logic that may be used to execute activities associated with the present disclosure.

FIG. 7 is a simplified block diagram illustrating potential electronics and logic that may be associated with any of the configurable display operations discussed herein. In at least one example embodiment, system 700 can include a touch controller 702, one or more processors 704, system control logic 706 coupled to at least one of processor(s) 704, system memory 708 coupled to system control logic 706, non-volatile memory and/or storage device(s) 732 coupled to system control logic 706, display controller 712 coupled to system control logic 732, display controller 712 coupled to a display device 710, power management controller 718 coupled to system control logic 706, and/or communication interfaces 716 coupled to system control logic 706.

System control logic 706, in at least one embodiment, can include any suitable interface controllers to provide for any suitable interface to at least one processor 704 and/or to any suitable device or component in communication with system control logic 706. System control logic 706, in at least one example embodiment, can include one or more memory controllers to provide an interface to system memory 708. System memory 708 may be used to load and store data and/or instructions, for example, for system 700. System memory 708, in at least one example embodiment, can include any suitable volatile memory, such as suitable dynamic random access memory (DRAM) for example. System control logic 706, in at least one example embodiment, can include one or more I/O controllers to provide an interface to display device 710, touch controller 702, and non-volatile memory and/or storage device(s) 732.

Non-volatile memory and/or storage device(s) 732 may be used to store data and/or instructions, for example within software 728. Non-volatile memory and/or storage device(s) 732 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 718 may include power management logic 730 configured to control various power management and/or power saving functions disclosed herein or any part thereof. In at least one example embodiment, power management controller 718 is configured to reduce the power consumption of components or devices of system 700 that may either be operated at reduced power or turned off when the electronic device is in a closed configuration. For example, in at least one example embodiment, when the electronic device is in a closed configuration, power management controller 718 performs one or more of the following: power down the unused portion of the display and/or any backlight associated therewith; allow one or more of processor(s) 704 to go to a lower power state if less computing power is required in the closed configuration; and shutdown any devices and/or components that are unused when an electronic device is in the closed configuration.

Communications interface(s) 716 may provide an interface for system 700 to communicate over one or more networks and/or with any other suitable device. Communications interface(s) 716 may include any suitable hardware and/or firmware. Communications interface(s) 716, in at least one example embodiment, may include, for example, a network adapter, a wireless network adapter, a telephone modem, and/or a wireless modem.

System control logic 706, in at least one example embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 704 may be packaged together with logic for one or more controllers of system control logic 706. In at least one example embodiment, at least one processor 704 may be packaged together with logic for one or more controllers of system control logic 706 to form a System in Package (SiP). In at least one example embodiment, at least one processor 704 may be integrated on the same die with logic for one or more controllers of system control logic 706. For at least one example embodiment, at least one processor 704 may be integrated on the same die with logic for one or more controllers of system control logic 706 to form a System on Chip (SoC).

For touch control, touch controller 702 may include touch sensor interface circuitry 722 and touch control logic 724. Touch sensor interface circuitry 722 may be coupled to detect touch input over a first touch surface layer and a second touch surface layer of a display (i.e., display device 710). Touch sensor interface circuitry 722 may include any suitable circuitry that may depend, for example, at least in part on the touch-sensitive technology used for a touch input device. Touch sensor interface circuitry 722, in one embodiment, may support any suitable multi-touch technology. Touch sensor interface circuitry 722, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 724 may be coupled to help control touch sensor interface circuitry 722 in any suitable manner to detect touch input over a first touch surface layer and a second touch surface layer. Touch control logic 724 for at least one example embodiment may also be coupled to output in any suitable manner digital touch input data corresponding to touch input detected by touch sensor interface circuitry 722. Touch control logic 724 may be implemented using any suitable logic, including any suitable hardware, firmware, and/or software logic (e.g., non-transitory tangible media), that may depend, for example, at least in part on the circuitry used for touch sensor interface circuitry 722. Touch control logic 724 for at least one embodiment may support any suitable multi-touch technology.

Touch control logic 724 may be coupled to output digital touch input data to system control logic 706 and/or at least one processor 704 for processing. At least one processor 704 for at least one embodiment may execute any suitable software to process digital touch input data output from touch control logic 724. Suitable software may include, for example, any suitable driver software and/or any suitable application software. As illustrated in FIG. 7, system memory 708 may store suitable software 726 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense. For example, electronic device 10 can have a portrait tablet configuration and a portrait closed clamshell configuration where edges of keyboard portion 14 extend or stick out from behind display portion 12.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

An electronic device is provided in one example embodiment and includes a plurality of electronic components (which can include any type of components, elements, circuitry, etc.). One particular example implementation of the electronic device may include a keyboard portion that includes a plurality of keys; a display portion that includes a first display interconnect for operating the electronic device in a first configuration, and a second display interconnect for operating the electronic device in a second configuration; and a docking portion that includes a keyboard interconnect configured to be mated with at least one of the first display interconnect and the second display interconnect.

In other embodiments, the display portion includes a display and the display operates in a landscape configuration when the electronic device is in the first configuration. Additionally, the display portion can include a display and the display operates in a portrait configuration when the electronic device is in the second configuration. In still other embodiments, the first display interconnect is located on a first side of the display portion and the second display interconnect is located on a second side of the display portion, and the first side is adjacent to the second side. In certain examples, the display portion can be connected to the keyboard portion in a landscape clamshell mode configuration, a landscape movie mode configuration, a tablet mode configuration, a portrait clamshell mode configuration, and a portrait movie mode configuration. The keyboard interconnect can be a pogo pin connector that can mate with the first display interconnect and the second display interconnect. In specific implementations, the display portion can include at least one tab that operates as a securing mechanism to secure the display portion to the keyboard portion. In addition, the docking portion can include at least one post to guide the display portion during rotation thereof. In a specific example, the display portion can be configured to operate as a standalone tablet. Also, the display portion may include a wireless module.

What is claimed is:

1. An electronic device, comprising:
   a plurality of electronic components;
   a keyboard portion that includes a plurality of keys;
   a display portion that includes:
      a display, wherein the display can face towards the keyboard portion in a first configuration and face away from the keyboard portion in a second configuration;
      a first display interconnect for operating the electronic device in a landscape configuration; and
      a second display interconnect for operating the electronic device in a portrait configuration; and
   a docking portion that includes a keyboard interconnect configured to be mated with the first display interconnect and the second display interconnect, wherein the keyboard interconnect includes a plurality of pin-out pins wherein at least a portion of the plurality of pin-out pins in a first configuration pin-out are opposite to at least a portion of the plurality of pin-out pins in a second configuration pin-out, wherein a pin of the plurality of the pin-out pins is positive voltage in the first configuration and the pin of the plurality of the pin-out pins is ground in the second configuration;
   wherein the first configuration pin-out is corresponding to the first configuration, and the second configuration pin-out is corresponding to the second configuration;
   a sensor to at least partially determine a current configuration and a control logic to determine a correct pin-out for the current configuration; and
   wherein a second pin of the plurality of the pin-out pins is data+ in the first configuration and the second pin of the plurality of the pin-out pins is data− in the second configuration.

2. The electronic device of claim 1, wherein the first display interconnect is located on a first side of the display portion and the second display interconnect is located on a second side of the display portion, and wherein the first side is adjacent to the second side.

3. The electronic device of claim 1, wherein the display portion can be connected to the keyboard portion in a landscape clamshell mode configuration when the display portion is coupled to the keyboard portion using the first display interconnect and the display is facing the keyboard portion, a landscape movie mode configuration when the display portion is coupled to the keyboard portion using the first display interconnect and the display is facing opposite of the keyboard portion, a portrait clamshell mode configuration when the display portion is coupled to the keyboard portion using the second display interconnect and the display is facing the keyboard portion, and a portrait movie mode configuration when the display portion is coupled to the keyboard portion using the second display interconnect and the display is facing opposite the keyboard portion.

4. The electronic device of claim 1, wherein the keyboard interconnect is a pogo pin connector that can mate with the first display interconnect and the second display interconnect.

5. The electronic device of claim 1, wherein the docking portion includes at least one securing tab that operates to removably secure the display portion to the keyboard portion and at least one display support to help align the display portion with the keyboard portion.

6. The electronic device of claim 1, wherein the sensor and control logic are located in the display portion.

7. The electronic device of claim 1, wherein the sensor and control logic are located in the keyboard portion.

8. A method comprising:
   connecting a display portion to a keyboard portion in a first configuration of an electronic device, wherein the display portion includes a display, wherein the display can face towards the keyboard portion in a first configuration and face away from the keyboard portion in a second configuration, a first display interconnect for operating in the first configuration, and wherein the electronic device includes a plurality of electronic components, a keyboard portion, and a docking portion that includes a keyboard interconnect;
   removing the display portion from the keyboard portion; and
   re-connecting the display portion to the keyboard portion in a second configuration of the electronic device, wherein the display portion includes a second display interconnect for operating in the second configuration, wherein the keyboard interconnect includes a plurality of pin-out pins adapted to connect to the first display interconnect and the second display interconnect, wherein at least a portion of the plurality of pin-out pins in a first configuration pin-out are opposite to at least a portion of the plurality of pin-out pins in a second configuration pin-out, wherein a pin of the plurality of pin-out pins is positive voltage in the first configuration and the pin of the plurality of pin-out pins is ground in the second configuration;
   wherein the first configuration pin-out is corresponding to the first configuration, and the second configuration pin-out is corresponding to the second configuration;
   a sensor to at least partially determine a current configuration and a control logic to determine a correct pin-out for the current configuration; and
   wherein a second pin of the plurality of the pin-out pins is data+ in the first configuration and the second pin of the plurality of the pin-out pins is data− in the second configuration.

9. The method of claim 8, wherein the first display interconnect is located on a first side of the display portion and the second display interconnect is located on a second side of the display portion, and wherein the first side is adjacent to the second side.

10. The method of claim 8, wherein the display portion can be connected to the keyboard portion in a landscape clamshell mode configuration when the display portion is coupled to the keyboard portion using the first display interconnect and the display is facing the keyboard portion, a landscape movie mode configuration when the display portion is coupled to the keyboard portion using the first display interconnect and the display is facing opposite of the keyboard portion, a portrait clamshell mode configuration when the display portion is coupled to the keyboard portion using the second display interconnect and the display is facing the keyboard portion, and a portrait movie mode configuration when the display portion is coupled to the keyboard portion using the second display interconnect and the display is facing opposite the keyboard portion.

11. The method of claim 8, wherein the keyboard interconnect is a pogo pin connector that can mate with the first display interconnect and the second display interconnect.

12. An electronic device, comprising:
a plurality of electronic components;
a keyboard portion that includes a keyboard interconnect, wherein the keyboard interconnect includes at least one securing tab that operates to removably secure a display portion to the keyboard portion, at least one display support to help align the display portion with the keyboard portion, and a plurality of pin-out pins; and
the display portion, wherein the display portion includes a display, a first display interconnect, and a second display interconnect, wherein the display portion can face towards the keyboard portion in a first configuration and face away from the keyboard portion in a second configuration, wherein the display portion is connected to the keyboard portion in a landscape clamshell mode configuration when the display portion is coupled to the keyboard portion using the first display interconnect and the display is facing the keyboard portion, a landscape movie mode configuration when the display portion is coupled to the keyboard portion using the first display interconnect and the display is facing opposite of the keyboard portion, a portrait clamshell mode configuration when the display portion is coupled to the keyboard portion using the second display interconnect and the display is facing the keyboard portion, and a portrait movie mode configuration when the display portion is coupled to the keyboard portion using the second display interconnect and the display is facing opposite the keyboard portion;
wherein at least a portion of the plurality of pin-out pins in a first configuration pin-out are opposite to at least a portion of the plurality of pin-out pins in a second configuration pin-out, wherein a pin of the plurality of the pin-out pins is positive voltage in the first configuration pin-out and the pin of the plurality of the pin-out pins is ground in the second configuration pin-out;
wherein the first configuration pin-out is corresponding to the first configuration, and the second configuration pin-out is corresponding to the second configuration;
a sensor to at least partially determine a current configuration and a control logic to determine a correct pin-out for the current configuration; and
wherein a second pin of the plurality of the pin-out pins is data+ in the first configuration and the second pin of the plurality of the pin-out pins is data− in the second configuration.

13. The electronic device of claim 12, wherein the display operates in a landscape configuration when the first display interconnect is connected to the keyboard interconnect, wherein the display operates in a portrait configuration when the second display interconnect is connected to the keyboard interconnect.

14. The electronic device of claim 12, wherein the first display interconnect is located on a first side of the display portion and the second display interconnect is located on a second side of the display portion, wherein the first side is adjacent to the second side.

15. A system for allowing a display portion to be coupled to a keyboard portion in a plurality of configurations, the system, comprising:

a docking portion on the keyboard portion, wherein the docking portion includes at least one securing tab that operates to removably secure the display portion to the keyboard portion, at least one display support to help align the display portion with the keyboard portion, and a keyboard interconnect, wherein the keyboard interconnect includes a plurality of pin-out pins;
a first display interconnect on the display portion, wherein the first display interconnect is configured to couple with the docking portion and allow the display portion to be coupled to the keyboard portion in a landscape configuration;
wherein the display portion can face towards the keyboard portion in a first configuration and face away from the keyboard portion in a second configuration;
a second display interconnect on the display portion, wherein the second display interconnect is configured to couple with the docking portion and allow the display portion to be coupled to the keyboard portion in a portrait configuration, wherein at least a portion of the plurality of pin-out pins in a first configuration pin-out are opposite to at least a portion of the plurality of pin-out pins in a second configuration pin-out, wherein a pin of the plurality of the pin-out pins is positive voltage in the first configuration pin-out and the pin of the plurality of the pin-out pins is ground in the second configuration pin-out;
wherein the first configuration pin-out is corresponding to the first configuration, and the second configuration pin-out is corresponding to the second configuration;
a sensor to at least partially determine a current configuration and a control logic to determine a correct pin-out for the current configuration; and
wherein a second pin of the plurality of the pin-out pins is data+ in the first configuration and the second pin of the plurality of the pin-out pins is data− in the second configuration.

16. The system of claim 15, wherein the display portion includes a display and the display operates in a landscape clamshell configuration when the system is in the first configuration and the display portion is coupled to the keyboard portion using the first display interconnect.

17. The system of claim 16, wherein the display portion includes a display and the display operates in a movie configuration when the system is in the second configuration and the display portion is coupled to the keyboard portion using the first display interconnect.

18. The system of claim 15, wherein the first display interconnect is located on a first side of the display portion and the second display interconnect is located on a second side of the display portion, and wherein the first side is adjacent to the second side.

19. The system of claim 15, wherein the docking portion includes a keyboard interconnect and the keyboard interconnect is a pogo pin connector that can mate with the first display interconnect and the second display interconnect.

* * * * *